United States Patent
Cochran

(10) Patent No.: US 12,356,157 B2
(45) Date of Patent: *Jul. 8, 2025

(54) MICROPHONE WITH ADVANCED FUNCTIONALITIES

(71) Applicant: AUDIO-TECHNICA U.S., INC., Stow, OH (US)

(72) Inventor: Benjamin M. Cochran, Akron, OH (US)

(73) Assignee: AUDIO-TECHNICA U.S., INC., Stow, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/617,491

(22) Filed: Mar. 26, 2024

(65) Prior Publication Data
US 2024/0236561 A1 Jul. 11, 2024

Related U.S. Application Data

(63) Continuation of application No. 17/453,713, filed on Nov. 5, 2021, now Pat. No. 11,974,102.
(Continued)

(51) Int. Cl.
*H04R 3/00* (2006.01)
*G06F 3/04847* (2022.01)
*H04R 1/08* (2006.01)

(52) U.S. Cl.
CPC ........... *H04R 3/00* (2013.01); *G06F 3/04847* (2013.01); *H04R 1/08* (2013.01)

(58) Field of Classification Search
CPC .... H04R 3/005; H04R 2499/11; H04R 1/326; H04R 29/004; H04R 3/00; H04S 2400/15
See application file for complete search history.

(56) References Cited

U.S. PATENT DOCUMENTS

| 7,561,700 B1 | 7/2009 | Barnardi et al. |
| 9,493,130 B2 | 11/2016 | Penilla et al. |

(Continued)

FOREIGN PATENT DOCUMENTS

| CA | 3138084 A1 | 5/2022 |
| CN | 105073073 A | 11/2015 |

(Continued)

OTHER PUBLICATIONS

Mexico Notice of Allowance dated Oct. 8, 2024 for Mexican Patent Application No. MX/a/2021/013547 from the Mexican Property of Institute Industrial, pp. 1-6, Mexico [Machine Translated].

(Continued)

*Primary Examiner* — Kile O Blair
(74) *Attorney, Agent, or Firm* — Sherman IP LLP; Kenneth L. Sherman; Hemavathy Perumal

(57) ABSTRACT

One embodiment provides a microphone device with advanced functionalities. The microphone device comprises one or more microphone units, one or more sensor units, and an automatic control system. The one or more sensor units are configured for capturing contextual information indicative of one or more real-time conditions of an environment of the microphone device. The automatic control system is configured for detecting one or more real-time changes to the environment of the microphone device based on the contextual information, invoking display of a graphical user interface (GUI) comprising information indicative of the one or more real-time changes, and adjusting one or more settings for the microphone device in response to the one or more real-time changes.

20 Claims, 11 Drawing Sheets

Related U.S. Application Data

(60) Provisional application No. 63/110,255, filed on Nov. 5, 2020.

(56) References Cited

U.S. PATENT DOCUMENTS

| | | | |
|---|---|---|---|
| 9,609,419 | B2 | 3/2017 | Taite et al. |
| 10,122,956 | B2 | 11/2018 | Jing et al. |
| 10,665,204 | B1 | 5/2020 | Goodsitt et al. |
| 10,698,983 | B2 | 6/2020 | Boeson |
| 11,019,005 | B2 | 5/2021 | Bulut et al. |
| 11,445,305 | B2 | 9/2022 | Sanger et al. |
| 2008/0146289 | A1 | 6/2008 | Korneluk et al. |
| 2014/0219471 | A1 | 8/2014 | Deshpande et al. |
| 2016/0104486 | A1 | 4/2016 | Penilla et al. |
| 2016/0142830 | A1 | 5/2016 | Hu |
| 2016/0381450 | A1 | 12/2016 | Taite et al. |
| 2017/0091731 | A1 | 3/2017 | Nelson et al. |
| 2017/0195795 | A1 | 7/2017 | Mei |
| 2017/0272858 | A1 | 9/2017 | Wei et al. |
| 2018/0084215 | A1 | 3/2018 | Jing et al. |
| 2018/0121623 | A1 | 5/2018 | Boesen et al. |
| 2018/0336892 | A1 | 11/2018 | Kim et al. |
| 2019/0007354 | A1 | 1/2019 | Bulut et al. |
| 2019/0012444 | A1 | 1/2019 | Lesso et al. |
| 2020/0100035 | A1 | 3/2020 | Sanger et al. |
| 2020/0150919 | A1 | 5/2020 | Rand et al. |
| 2021/0195354 | A1 | 6/2021 | Cavenaugh et al. |

FOREIGN PATENT DOCUMENTS

| | | |
|---|---|---|
| CN | 106101365 A | 11/2015 |
| CN | 114449409 A | 5/2022 |
| EP | 2690886 A1 | 1/2014 |
| EP | 3082350 A1 | 10/2016 |
| EP | 3996386 | 5/2022 |
| GB | 2600831 A | 5/2022 |
| JP | 2011165056 A | 8/2011 |
| JP | 2022-75641 A | 5/2022 |
| TW | 202224449 A | 6/2022 |
| WO | 2014163739 A1 | 10/2014 |
| WO | 2016123560 A1 | 8/2016 |
| WO | 2017031208 A1 | 2/2017 |
| WO | 2020003293 A2 | 1/2020 |
| WO | 2021021468 A1 | 2/2021 |

OTHER PUBLICATIONS

Japanese Notice of Allowance dated Apr. 16, 2024 for Japanese Patent Application No. 2021-181133 from the Japanese Patent Office, pp. 1-32, Japan [Machine Translated].

Mexico Office Action dated Aug. 15, 2024 for Mexican Patent Application No. MX/a/2021/013547 from the Mexican Property of Institute Industrial, pp. 1-3, Mexico [Machine Translated].

Canadian Notice of Allowance dated May 16, 2024 for Canadian Patent Application No. 3,138,084 from the Canadian Intellectual Property Office, p. 1, Canada.

European Notice of Grant dated Oct. 30, 2024 for European Application No. 21206291.3 from European Patent Office. pp. 1-7, Munich, Germany.

Brazilian Office Action dated Nov. 14, 2024 for Brazilian Patent Application No. BR102021022228 from the Brazilian Patent & Trademark Office , pp. 1-3, Brazil [Machine Translation].

Chinese Notification to Grant dated Dec. 6, 2024 for Chinese Patent Application No. 202111306877X from the China National Intellectual Property Administration, p. 1-4, China [Machine Translation].

UK Combined Search and Examination Report dated Feb. 22, 2022 for UK Patent Application No. 2115810.0 from UK Intellectual Property Office (UKIPO), pp. 1-8, South Wales.

Extended European Search Report dated Apr. 5, 2022 for European Application No. 21206291.3 from European Patent Office. pp. 1-9, Munich, Germany.

Canadian Examiner's Requisition dated Dec. 21, 2022 for Canadian Patent Application No. 3,138,084 from the Canadian Intellectual Property Office, pp. 1-3, Canada.

Japanese Office Action dated Feb. 28, 2023 for Japanese Patent Application No. 2021-181133 from the Japanese Patent Office, pp. 1-4, Japan (English-language translation).

Canadian Examiner's Requisition dated Sep. 8, 2023 for Canadian Patent Application No. 3,138,084 from the Canadian Intellectual Property Office, pp. 1-3, Canada.

Japanese Final Office Action dated Oct. 31, 2023 for Japanese Patent Application No. 2021-181133 from the Japanese Patent Office, pp. 1-2, Japan (English-language translation).

U.S. Non-Final Office Action, U.S. Appl. No. 17/453,713 mailed Aug. 16, 2023.

U.S. Notice of Allowance, U.S. Appl. No. 17/453,713 mailed Dec. 28, 2023.

300

| | UNIT | Output Phase | MID (Omni) Phase Reverse | MID (Omni) Gain | MID (Wide cardioid) Phase Reverse | MID (Wide cardioid) Gain | MID (Cardioid) Phase Reverse | MID (Cardioid) Gain | MID (Super cardioid) Phase Reverse | MID (Super cardioid) Gain | MID (Figure-8) Phase Reverse | MID (Figure-8) Gain | SIDE (Figure-8) Phase Reverse | SIDE (Figure-8) Gain |
|---|---|---|---|---|---|---|---|---|---|---|---|---|---|---|
| 1 | MID-Front | Negative | On (POS) | Unity | On (POS) | Unity | On (POS) | Unity | On (POS) | Unity | On (POS) | Unity | Off | Off |
| 2 | MID-Back | Negative | On (POS) | Unity | On (POS) | -10 dB | Off | Off | Off (NEG) | -10 dB | Off (NEG) | Unity | Off | Off |
| 3 | SIDE-Left | Negative | Off | Off | Off | Off | Off | Off | Off | Off | Off | Off | On (POS) | Unity |
| 4 | SIDE-Right | Negative | Off | Off | Off | Off | Off | Off | Off | Off | Off | Off | Off (NEG) | Unity |
| MIX | | | MONO = 1+2 | | MONO = 1+2 | | MONO = 1 | | MONO = 1+2 | | MONO = 1+2 | | MONO = 3+4 | |

| UNIT | | Output Phase | STEREO (127deg) | | STEREO (90deg) | |
|---|---|---|---|---|---|---|
| | | | Phase Reverse | Gain | Phase Reverse | Gain |
| 1 | MID-Front | Negative | On (POS) | Unity | On (POS) | Unity |
| 2 | MID-Back | Negative | Off | Off | Off | Off |
| 3 | SIDE-Left | Negative | On (POS) | Unity | On (POS) | -6dB |
| 4 | SIDE-Right | Negative | Off (NEG) | Unity | Off (NEG) | -6dB |
| Mix | | | STEREO L = 1+(3+4) R = 1-(3+4) | | STEREO L = 1+(3+4) R = 1-(3+4) | |

FIG. 4

MICROPHONE WITH ADVANCED FUNCTIONALITIES

CROSS REFERENCE TO RELATED APPLICATIONS

This application is a continuation of U.S. Non-Provisional patent application Ser. No. 17/453,713, filed on Nov. 5, 2021, which in turn claims priority to U.S. Provisional Patent Application Ser. No. 63/110,255, filed on Nov. 5, 2020, all incorporated herein by reference.

TECHNICAL FIELD

One or more embodiments relate generally to audio systems, and in particular, a microphone with advanced functionalities.

BACKGROUND

Microphones are used to capture audio, such as at an event. At an event, microphones, are typically placed in difficult-to-access locations, such that the microphones are positioned once and not easily reconfigured. Further, conventional array microphones used at an event are not capable of dynamically adapting or responding to conditions in its environment other than audio conditions. As professionals such as broadcast engineers and live event production personnel typically control broadcast of an event from a remote location (i.e., a location remote from the event), any changes to a microphone used at the event cannot be accomplished if the changes cannot be made remotely. Further, even if a microphone includes internal/onboard digital signal processing (DSP), the microphone must be recalled or configured via manual interaction with a piece of software to effect any changes to the microphone.

Some conventional Ethernet-based array microphones allow users to remotely control or modify audio parameters of the microphones via Ethernet, but the microphones do not provide users with information about conditions in its environment other than audio conditions (i.e., what the users hear). For example, the microphones may allow for control of pick-up patterns, but do not utilize sensor devices to capture information/provide feedback indicative of particular conditions of its environment such as a location or position of the microphones. Some conventional smart microphones are remotely controlled via a plug-in for a digital audio workstation (DAW) or a software application (e.g., operating on a remote device) that require manual interaction from a user to effect any changes to the microphones.

SUMMARY

Embodiments of the invention relate generally to audio systems, and in particular, a microphone with advanced functionalities.

One embodiment provides a microphone device with advanced functionalities. The microphone device comprises one or more microphone units, one or more sensor units, and an automatic control system. The one or more sensor units are configured for capturing contextual information indicative of one or more real-time conditions of an environment of the microphone device. The automatic control system is configured for detecting one or more real-time changes to the environment of the microphone device based on the contextual information, invoking display of a graphical user interface (GUI) comprising information indicative of the one or more real-time changes, and adjusting one or more settings for the microphone device in response to the one or more real-time changes. Other embodiments include a method for providing a microphone device with advanced functionalities. These features contribute to the advantage of providing feedback or information indicative of real-time conditions of an environment of a microphone device, such as a location or position of the microphone device, and enabling setting up and monitoring of the microphone device from a perspective of the conditions of the environment.

One or more of the following features may be included. In some embodiments, the adjusting comprises dynamically adjusting the one or more settings for the microphone device utilizing artificial intelligence. These optional features contribute to the advantage of dynamically adjusting the microphone device from the perspective of the conditions of the environment.

In some embodiments, a digital signal processing (DSP) configuration corresponding to a user is automatically set up in response to the one or more sensor units reading an identifier of a user from a Near Field Communication (NFC) enabled device. Digital signal processing is applied for each output channel of the microphone device in accordance with the DSP configuration. These optional features contribute to the advantage of dynamically setting up the microphone device with information particular to a user upon detecting the user is within proximity of the microphone device.

In some embodiments, one or more output channels of the microphone device is automatically set up with one or more labels in response to the one or more sensor units reading an identifier of a user from a Near Field Communication (NFC) enabled device. The one or more labels are based on the identifier. These optional features contribute to the advantage of dynamically setting up the microphone device with information particular to a user upon detecting the user is within proximity of the microphone device.

These and other features, aspects and advantages of the present invention will become understood with reference to the following description, appended claims and accompanying figures.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates a table describing different pre-defined mono virtual polar patterns, in one or more embodiments;

FIG. 4 illustrates a table describing different pre-defined stereo virtual polar patterns, in one or more embodiments;

The detailed description explains the preferred embodiments of the invention together with advantages and features, by way of example with reference to the drawings.

DETAILED DESCRIPTION

One or more embodiments relate generally to audio systems, and in particular, a microphone with advanced functionalities. One embodiment provides a microphone device with advanced functionalities. The microphone device comprises one or more microphone units, one or more sensor units, and an automatic control system. The one or more sensor units are configured for capturing contextual information indicative of one or more real-time conditions of an environment of the microphone device. The automatic control system is configured for detecting one or more real-time changes to the environment of the microphone device based on the contextual information, invoking display of a graphical user interface (GUI) comprising information indicative of the one or more real-time changes, and adjusting one or more settings for the microphone device in response to the one or more real-time changes. Other embodiments include a method for providing a microphone device with advanced functionalities.

For expository purposes, the term "audio system" as used herein generally refers to a system configured to receive one or more audio data streams from one or more sources (e.g., microphone devices), process the data streams, and distribute one or more resulting processed data streams to one or more devices (e.g., recording devices, speaker devices, storage devices, etc.) for audio reproduction, recording and/or storage.

One or more embodiments provide a microphone with advanced functionalities including providing feedback or information indicative of real-time conditions of its environment, such as a location or position of the microphone, and enabling setting up and monitoring of the microphone from a perspective of the conditions of its environment.

One or more embodiments provide a microphone with advanced functionalities for use in different audio systems such as, but not limited to, wireless systems such as wireless microphone systems, public address (PA) systems, studio audio systems, broadcast audio systems, audiovisual (AV) systems, and other types of professional audio systems operated by broadcasters (e.g., a radio broadcaster, a TV broadcaster, etc.), festivals, fairs, film studios, conventions, corporate events, houses of worship, sports leagues, schools, recording studios (i.e., facilities for sound recording, mixing, and audio production), facilities for audio post production, programming networks, theaters, venues (e.g., sports venues, music venues, etc.), etc.

Figure 1:
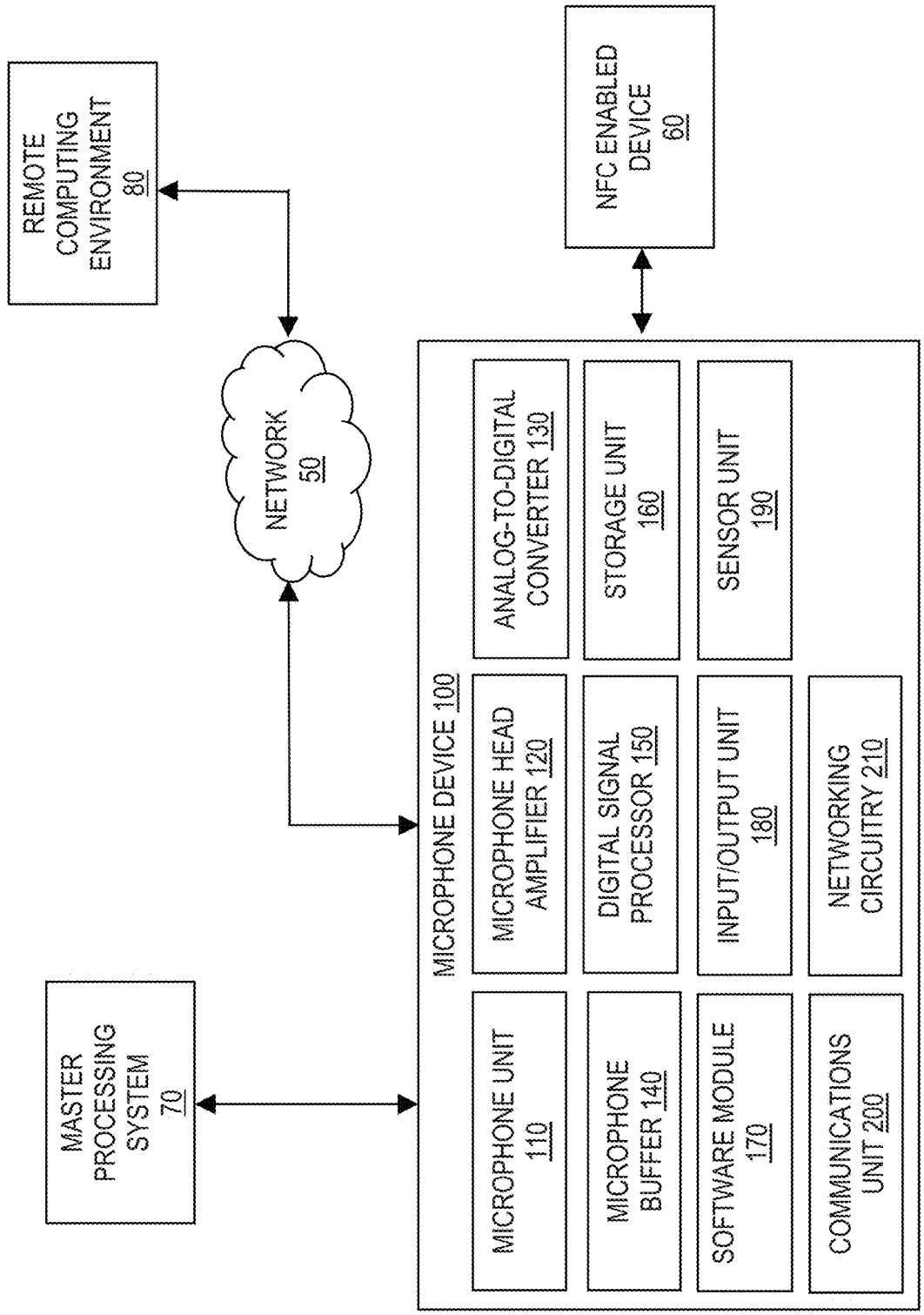
FIG. 1 illustrates an example professional audio system comprising a microphone device with advanced functionalities, in one or more embodiments.

FIG. 1 is an example professional audio system 10 comprising a microphone device 100 with advanced functionalities, in one or more embodiments. The microphone device 100 comprises one or more microphone units 110. Each microphone unit 110 is configured to capture or pick-up sound as an analog signal. In one embodiment, the microphones units 110 include one or more types of microphone capsules ("mic capsules").

In one embodiment, the microphone device 100 comprises a microphone head amplifier 120 configured to amplify each analog signal from the microphone units 110 by providing a gain. For example, in one embodiment, the head amplifier 120 provides a gain optimized for the microphone units 110 at maximum sound pressure level (SPL) conditions.

In one embodiment, the microphone device 100 comprises an analog-to-digital converter (ADC) 130 configured to convert each amplified analog signal from the head amplifier 120 into a digital signal (i.e., analog-to-digital conversion). The ADC 130 performs analog-to-digital conversion at a sampling rate, a buffer size, and a bit depth specified during configuration.

In one embodiment, the microphone device 100 comprises a microphone buffer 140 with the buffer size specified during configuration. During analog-to-digital conversion, the ADC 130 samples an analog signal at the sampling rate, and writes resulting audio samples to the buffer 140. The sampling rate for the ADC 130 may vary. For example, in one embodiment, the ADC 130 comprises a high-quality, four channel ADC that provides transparent 24 bit conversion at sampling rates up to 48 kHz (i.e., bit depth: minimum 24 bit, sampling rate: minimum 48 kHz, dynamic range: 114 dB). As another example, in one embodiment, the ADC 130 provides sampling rates up to 192 kHz.

In one embodiment, the microphone device 100 comprises one or more input/output (I/O) units 180 integrated in or coupled to the microphone device 100. In one embodiment, the I/O units 180 include, but are not limited to, a physical user interface (PUI) and/or a graphical user interface (GUI), such as a touch interface (e.g., a touch pad or a touch screen), a control knob, a button, a dial mechanism (e.g., a rotary dial), a LED system 181 (FIG. 2) including one of more LEDs, a display screen 182 (FIG. 2), a keypad, a keyboard, a haptic feedback device, etc. In one embodiment, a user can utilize at least one I/O unit 180 to configure one or more user preferences, configure one or more parameters, provide user input, etc.

In one embodiment, the microphone device 100 comprises computing resources, such as one or more digital signal processors 150 and one or more storage units 160. One or more software modules 170 may execute/operate on the microphone device 100 utilizing the computing resources. The software modules 170 include, but are not limited to, the following: (1) an internal/onboard digital signal processing (DSP) system 171 (FIG. 2) configured to provide digital signal processing of digital signals from the ADC 130, (2) a capsule mixing system 172 (FIG. 2) configured to combine digital signals from the DSP system 171 to create/produce independent virtual polar patterns, (3) a GUI system 173 (FIG. 2) configured to generate one or more GUIs for display (e.g., on the display screen 182, on a NFC enabled device 60, in a web browser, etc.), and (4) an automatic control system 174 (FIG. 2) configured to provide advanced functionalities. As described in detail later herein, the advanced functionalities include providing feedback or information indicative of real-time conditions of an environment of the microphone device 100, such as a location or position of the microphone device 100, and dynamically adjusting one or more settings for the microphone device 100 and/or one or more virtual polar patterns created/produced by the microphone device 100 based on the conditions.

In one embodiment, the microphone device 100 comprises one or more sensor units 190 integrated in or coupled to the microphone device 100. The sensor units 190 are configured to capture contextual information indicative of real-time conditions of the environment of the microphone device 100. In one embodiment, the sensor units 190 include, but are not limited to, a Near Field Communication (NFC) sensor 191 (FIG. 2) (e.g., NFC antenna), a Global Navigation Satellite System (GNSS)/Global Positioning System (GPS) 192 (FIG. 2), a motion sensor 193 (FIG. 2), etc. As described in detail later herein, the automatic control system 174 dynamically adjusts the settings for the microphone device 100 and/or virtual polar patterns created/produced by the microphone device 100 based in part on the contextual information captured by the sensor units 190.

In one embodiment, the microphone device 100 is configured to exchange data with a NFC enabled device 60 via the NFC sensor 191. Specifically, the NFC sensor 191 is activated in response to the NFC sensor 191 detecting the NFC enabled device 60 positioned within close proximity (e.g., 4 cm) of the microphone device 100/NFC sensor 191. As described in detail later herein, the NFC sensor 191 enables the NFC enabled device 60 to read data from, and write data to, the microphone device 100 over NFC. In one embodiment, the NFC enabled device 60 includes a software application configured to exchange data with some of the software modules 170 executing/operating on the microphone device 100.

Examples of a NFC enabled device 60 include, but are not limited to, a NFC card (e.g., an ID tag, an access card), a mobile electronic device (e.g., a smart phone, a laptop computer, a tablet, etc.), a wearable device (e.g., a smart watch, a smart band, etc.), a desktop computer, a smart appliance (e.g., a smart speaker, a smart television, etc.), an Internet of Things (IOT) device, etc.

In one embodiment, the microphone device 100 comprises one or more communications units 200. Each communications unit 200 enables the microphone device 100 to exchange data with a different component of the professional audio system 10, such as a master processing system 70 over a wired connection (e.g., a network cable) and/or a remote computing environment 80 over a communications network/connection 50 (e.g., a wireless connection such as a Wi-Fi connection or a cellular data connection, a wired connection, or a combination of the two). The communications units 200 may comprise any suitable communications circuitry operative to connect to a communications network and to exchange communications operations and media between the microphone device 100 and other components of the professional audio system 10. The communications units 200 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the master processing system 70 is configured to output and interface with one or more other components of the professional audio system 10 for additional processing and output, such as an audio processing device, an audio playback/output device, etc. An audio processing device is configured for audio processing (e.g., an audio mixer for audio mixing, a recording device for recording, an audio mastering device for audio mastering, etc.). An audio playback/output device is configured for audio playback/output (e.g., a speaker for reproducing audio, etc.).

In one embodiment, the remote computing environment 80 includes computing resources, such as one or more servers and one or more storage units. One or more applications that provide higher-level services may execute/operate on the remote computing environment 80 utilizing the computing resources of the remote computing environment 80. For example, in one embodiment, the remote computing environment 80 provides an online platform for hosting one or more online services (e.g., an audio streaming service, etc.) and/or distributing one or more updates/upgrades. For example, the remote computing environment 80 may maintain and distribute updates/upgrades such as, but not limited to, an updated audio plugin, a firmware upgrade, a software update for a software module 170 (e.g., the automatic control system 174), etc. As another example, in one embodiment, the remote computing environment 80 may comprise a cloud computing environment providing shared pools of configurable computing system resources and higher-level services (e.g., cloud applications providing professional-grade audio processing and production tools).

In one embodiment, the microphone device 100 comprises a networking circuitry 210 configured to provide audio-over-IP (AoIP) interoperability standard. For expository purposes, the terms "AoIP" and "network audio protocol" are used interchangeably in this specification. In one embodiment, the microphone device 100 uses a combination of a network audio protocol for networked audio and DSP (via the DSP system 171) for microcontroller actions. Examples of one or more network audio protocols the networking circuitry 210 supports includes, but is not limited to, Dante, RAVENNA, etc. For example, in one embodiment, the networking circuitry 210 comprises a hardware module or a chip for Dante.

In one embodiment, the networking circuitry 210 is configured to control one or more settings for the microphone device 100. For example, in one embodiment, the networking circuitry 210 is configured to control one or more settings for the microphone device 100 in response to user input (e.g., received via an I/O unit 180 such as a PUI or a GUI, a sensor unit 190 such as the NFC sensor 191, etc.). As another example, in one embodiment, the networking circuitry 210 is configured to select one or more settings for the microphone device 100 utilizing a control protocol (e.g., Ember+).

Figure 2:
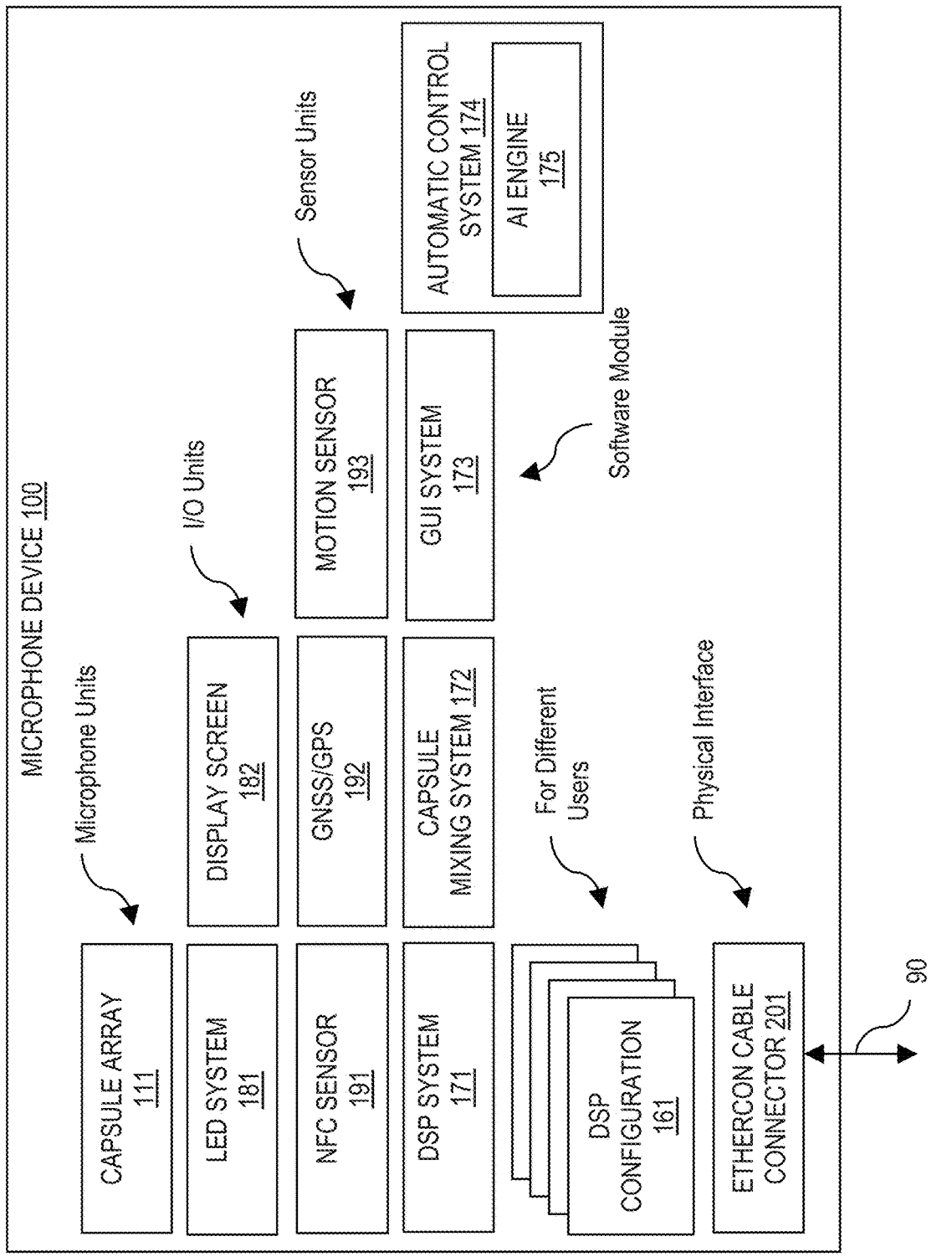
FIG. 2 illustrates some components of the microphone device, in one or more embodiments.

FIG. 2 illustrates some components of the microphone device 100, in one or more embodiments. In one embodiment, the microphone units 110 include an array 111 of mic capsules ("capsule array"). In one embodiment, the capsule array 111 comprises different types of mic capsules such as, but not limited to, the following: at least two large dual-diaphragm mic capsules, one mic capsule positioned on-axis, and one mic capsule positioned 900 off axis. The capsule array 111 provides at least four independent cardioid outputs/signals. The at least four independent cardioid outputs/signals include, but are not limited to, the following output channels: Channel 1 representing a MID-Front mic, Channel 2 representing a MID-Back mic, Channel 3 representing a SIDE-Left mic, and Channel 4 representing a SIDE-Right mic. In another embodiment, the microphone units 110 include one or more non-array microphones.

In one embodiment, some of the advanced functionalities provided by the microphone device 100 involve utilizing real-time sensor readings from the NFC sensor 191. For example, in one embodiment, the NFC sensor 191 allows a user, via a NFC enabled device 60, to confirm/review/change one or more settings for the microphone device 100 and/or review one or more real-time sensor readings/measurements captured by the sensor units 190. As another example, in one embodiment, the NFC sensor 191 allows a user to transfer data (e.g., presets) from a NFC enabled device 60 to the microphone device 100. This removes the need to locally store presets at the microphone device 100, thereby reducing memory/storage requirements.

As another example, in one embodiment, the microphone device 100 can automatically setup a user's unique DSP configuration 161 (e.g., DSP curve setting) in response to reading, via the NFC sensor 191, an identifier of the user from a NFC enabled device 60 (e.g., a name tag, an identification (ID) tag, or a software application executing/operating on the NFC enabled device 60) during an event/session involving the user. For example, in response to reading the ID of the user, the automatic control system 174 may retrieve the DSP configuration 161 (e.g., from the storage units 160 of the microphone device 100, the remote computing environment 80, etc.), and load the DSP configuration 161 such that the microphone device 100 processes digital signals (via the DSP system 171) during the event/session in accordance with the DSP configuration 161. Therefore, the microphone device 100 is automatically setup with information particular to a user upon detecting the user (via the NFC enabled device) is within proximity of the microphone device 100. For example, during a radio broadcast, a radio host may tap their NFC enabled ID tag against the microphone device 100/NFC sensor 191 to automatically setup the microphone device 100 with the radio host's unique DSP configuration 161.

As another example, in one embodiment, in response to reading, via the NFC sensor 191, an identifier of a user, such as a name or an ID of the user, from a NFC enabled device 60 (e.g., a name tag, an ID tag, or a software application executing/operating on the NFC enabled device 60), the microphone device 100 can automatically setup an output channel of the microphone device 100 with a label based on the identifier. For example, the output channel may be labeled with a label indicative of the name of the user or the ID of the user. This enables a professional, such as a microphone operator or a broadcast engineer, to easily determine which output channel of the microphone device 100 captures audio of the user during an event/session involving the user. Therefore, the microphone device 100 is automatically setup with information particular to a user upon detecting the user (via the NFC enabled device) is within proximity of the microphone device 100. For example, during a live concert, a performer may tap their NFC enabled ID tag against the microphone device 100/NFC sensor 191 to automatically setup the microphone device 100 to label an output channel of the microphone device 100 with a name or an ID of the performer.

The GNSS/GPS sensor 192 is configured to capture contextual information indicative of a position or location of the microphone device 100. In one embodiment, some of the advanced functionalities provided by the microphone device 100 involve utilizing real-time sensor readings/measurements from the GNSS/GPS sensor 192. For example, in one embodiment, the GNSS/GPS sensor 192 allows a user, via a NFC enabled device 60 or an I/O unit 180 of the microphone device 100, to confirm/review longitudinal and latitudinal readings/coordinates of the microphone device 100.

The motion sensor 193 is configured to capture contextual information indicative of internal motion (i.e., of the microphone device 100) including at least one of the following: (1) a real-time direction of the microphone device 100 relative to a compass, (2) a real-time position of the microphone device 100 on three coordinate axes X, Y, and Z, and (3) whether the microphone device 100 has moved/shifted/tilted since the microphone device 100 was locked in its position ("locked position") (i.e., where the microphone device 100 was originally positioned when first deployed in the environment or an initial/intended placement). In one embodiment, the motion sensor 193 comprises an accelerator, a gyroscope, and/or a magnetometer (e.g., 6-9 Axis gyroscope/magnetometer). In one embodiment, some of the advanced functionalities provided by the microphone device 100 involve utilizing real-time sensor readings/measurements from the motion sensor 193. For example, in one embodiment, the motion sensor 193 allows a user, via a NFC enabled device 60 or an I/O unit 180 of the microphone device 100, to confirm/review a real-time direction of the microphone device 100 relative to true North. A real-time direction of the microphone device 100 relative to true North allows a determination of whether the microphone device 100 is pointed North, South, East, or West. As another example, in one embodiment, the motion sensor 193 allows the user to confirm/review a real-time position of the microphone device 100 on the X, Y, and Z axes. A real-time position of the microphone device 100 on the X, Y, and Z axes allows a determination of a real-time orientation (e.g., via a gyroscope) of the microphone device 100 in space (i.e., whether the microphone device 100 is positioned upright or upside down, whether the microphone device 100 has shifted from its locked position, etc.). For example, if wind or physical interaction (e.g., an individual knocked off the microphone device 100) caused the microphone device 100 to move/shift/tilt from its locked position, the motion sensor 193 enables a user (e.g., a professional such as a microphone operator, a broadcast engineer, or a live event production personnel) to determine whether the microphone device 100 has moved/shifted/tilted based on a real-time direction or a real-time position of the microphone device 100.

In one embodiment, the LED system 181 comprises an array of LEDs ("LED array") and a driver for controlling/dimming the LED array (i.e., the driver is a controller/dimmer). For example, in one embodiment, the LED array comprises a ring of 8-12 RGB LEDs. As another example, in one embodiment, the LED array comprises conspicuous (i.e., easily visible) LED lenses providing multi-color LED. In one embodiment, some of the advanced functionalities provided by the microphone device 100 involve utilizing the LED system 181. For example, in one embodiment, the LED array is used to provide feedback or information about different real-time conditions of the environment of the microphone device 100 (e.g., conditions other than audio conditions), wherein the conditions are based on real-time sensor readings/measurements from the sensor units 190.

Table 1 below provides examples of different types of feedback or information the LED array can provide.

TABLE 1

| Color of LED Array | Light Pattern of LED Array | Feedback/ Information |
|---|---|---|
| Blue | "Cascading" sweeping LED ring: LED addr 0, 3, 6, 9 ON for 0.25 sec, OFF, increment, OFF, loop | Initial Power Up/No Network Connection |
| Blue | All LEDs slow blink (dim up/down over 1.5 sec) 3 times on blue then solid ON (user selected color) unless user has opted for LEDs OFF | Network Connection Established |
| Blue | All LEDs fast blink (dim up/down over 0.5 sec) until 'NFC enabled device Transferring Data' | NFC enabled device Detected |

TABLE 1-continued

| Color of LED Array | Light Pattern of LED Array | Feedback/ Information |
|---|---|---|
| Blue | All LEDs fast blink (dim up/down over 0.5 sec) until 'NFC enabled device Transferring Data' | NFC enabled device Transferring Data |
| Blue | All LEDs fast blink (dim up/down over 0.5 sec) until 'NFC enabled device Transferring Data' | NFC enabled device Data Transfer Complete |
| User Defined | All LEDs fast blink (dim up/down over 0.75 sec) 3 times then solid blue unless user has opted for LEDs OFF | ID/Wink Function |

In one embodiment, for digital signals from the ADC 130, the DSP system 171 is configured to provide onboard DSP that includes, but is limited to, polarity, digital gain, high pass filter (HPF), low pass filter (LPF), etc. For example, in one embodiment, the DSP system 171 provides selectable polarity reversal (i.e., reversing polarity of a digital signal or phase reverse). As another example, in one embodiment, the DSP system 171 provides 48 dB of digital gain in 6 dB steps. As another example, in one embodiment, the DSP system 171 provides two state selectable HPF (e.g., 47 Hz at 18 dB/octave, and 80 Hz at 12 dB/octave). As another example, in one embodiment, the DSP system 171 provides two state selectable LPF (e.g., 18 kHz @ 18 dB/octave, and 8.2 kHz @ 6 dB/octave).

In one embodiment, the capsule mixing system 172 is configured to create/produce different pre-defined virtual polar patterns, wherein each polar pattern has its own adjustable gain, LPF, and HPF. For example, in one embodiment the pre-defined virtual polar patterns include, but are not limited to, at least five mono virtual polar patterns and at least two stereo virtual polar patterns. The at least five mono virtual polar patterns include, but are not limited to, the following: omnidirectional, subcardioid/wide cardioid, cardioid, supercardioid, bidirectional (Figure-8), etc. The at least two stereo virtual polar patterns include, but are not limited to, the following: wide stereo (i.e., 127-degree angle between the microphone units 110), narrow stereo (i.e., 90-degree angle between the microphone units 110), etc.

In one embodiment, the automatic control system 174 is configured to dynamically adjust, based on real-time sensor readings/measurements from the sensor units 190, one or more settings for the microphone device 100 and/or one or more virtual polar patterns created/produced by the microphone device 100 (via the DSP system 171 and the capsule mixing system 172) in response to one or more changes to one or more conditions of the environment of the microphone device 100. For example, in one embodiment, if real-time contextual information captured by the motion sensor 193 indicates that an orientation of the microphone device 100 in space has changed (e.g., the microphone device 100 shifts due to wind, the microphone device 100 is knocked off its locked position, etc.), the automatic control system 174 triggers the GUI system 173 to generate a GUI including feedback or information indicative of this change, wherein the GUI is provided for display, such that a user can confirm/review/change one or more settings for the microphone device 100 via the GUI. As another example, in one embodiment, in response to the change in the orientation of the microphone device 100 in space, the automatic control system 174 triggers the DSP system 171 and/or the capsule mixing system 172 to dynamically adjust/shape one or more virtual polar patterns created/produced in response to the change. In one embodiment, the one or more virtual polar patterns are adjusted utilizing artificial intelligence. For example, supervised machine learning is used to train an AI engine 175 (e.g., a neural network) based on training data capturing different virtual polar patterns, gain settings, HPFs, LPFs, and other equalization settings suitable for different conditions of the environment of the microphone device 100, and the resulting trained AI engine 175 is deployed in the automatic control system 174 for use in determining one or more adjustments to virtual polar patterns created/produced, gain settings, HPF, LPF, and other equalization settings of the microphone device 100 based on real-time conditions. In another embodiment, the AI engine 175 is deployed on a remote computing environment 80 the microphone device 100 exchanges data with.

In one embodiment, the automatic control system 174 is configured to compare real-time latitude, longitude, and/or altitude readings for the microphone device 100 against a database of different latitude, longitude, and/or altitude readings, and determine (via the AI engine 175) one or more suggestions for polar pattern (e.g., pattern direction), gain settings, and equalization settings for the microphone device 100 based on the comparison.

In one embodiment, if the microphone device 100 has shifted position by a known value (i.e., pre-determined threshold) in X, Y, and Z coordinates, as well as relative to the GNSS/GPS coordinates of its locked position (i.e., where the microphone device 100 was originally positioned when first deployed in the environment or an initial/intended placement), the automatic control system 174 triggers the DSP system 171 and/or the capsule mixing system 172 to "re-aim" toward the locked position by dynamically adjusting one or more virtual polar patterns created/produced, gain, HPF, LPF, or other equalization. In one embodiment, these adjustments are determined using the AI engine 175.

In one embodiment, the automatic control system 174 is configured to record or maintain a buffer of sensor readings/ measurements captured during a pre-determined window of time or the entirety of an event/session. The buffer enables the automatic control system 174 to detect when the position or orientation of the microphone device 100 has moved enough to impact its audio quality.

In one embodiment, the microphone device 100 is configured to learn preferred modes of operation for different contexts/environments. For example, in a learning phase, audio and sensor readings/measurements captured via the microphone device 100 are analyzed (e.g., on a remote computing environment) to determine baseline settings for use in similar contexts/environments. In one embodiment, the AI engine 175 is trained to learn the baseline settings. In another embodiment, the baseline settings are stored on the microphone device 100 as a recallable preset. After the learning phase, when the automatic control system 174 detects (via the AI engine 175) that the microphone device 100 is deployed in similar contexts/environments, the automatic control system 174 is configured to automatically set the microphone device 100 with the baseline settings or provide a recommendation to use the baseline settings (e.g., the recommendation is provided via an I/O unit 180, on a NFC enabled device 60, in a web browser, etc.). For example, the baseline settings may be suitable for a context/ environment involving a live sporting event (e.g., equalization of some output channels of the microphone device 100 are optimized for crowd noise on one side of the microphone device 100, and equalization of other output channels of the microphone device 100 are optimized for conversations among players, coaches and others on a bench on the other side of the microphone device 100).

In one embodiment, based on real-time GPS coordinates of the microphone device 100, the automatic control system 174 retrieves data related to weather conditions at the environment of the microphone device 100, such as wind speed and other weather information, and determines (via the AI engine 175) whether to send an alert or notification to a professional (e.g., a microphone operator) regarding the weather conditions. The alert or notification may include a recommendation to consider alternative EQ settings for the microphone device 100 or to add additional windscreen protection to the microphone device 100.

In one embodiment, the communications units 200 include an Ethercon cable connector 201 configured to connect the microphone device 100 to a network cable 90. For example, in one embodiment, the microphone device 100 is wired back to the master processing system 70 via the network cable 90. Examples of different types of network cables 90 include, but are not limited to, CAT 5 cables, fiber optic cables, or other standard cables used for data transfer.

In one embodiment, the GUI system 173 is configured to generate a GUI including at least one of the following: (1) one or more output-dependent settings for the microphone device 100 (e.g., polar pattern, gain, HPF, LPF, other equalization settings), and (2) one or more global settings/parameters for the microphone device 100. Each GUI generated by the GUI system 173 is provided for display (e.g., on the display screen 182, on a NFC enabled device 60, in a web browser, etc.) for user confirmation/review. In one embodiment, a GUI generated by the GUI system 173 operates as a control panel, providing a user with controls and status monitoring for the output channels of the microphone device 100. For example, in one embodiment, a GUI generated by the GUI system 173 is implemented as a web server GUI that a user accesses. As another example, in one embodiment, a GUI generated by the GUI system 173 is displayed within a software application executing/operating on an electronic device (e.g., a NFC enabled device 60).

Table 2 provides an example of output-dependent settings for the microphone device 100 and corresponding controls included in a GUI.

FIG. 3 illustrates a table 300 describing different predefined mono virtual polar patterns the capsule mixing system 172 is configured to create/produce, in one or more embodiments. As shown in FIG. 3, polarity (i.e., output phase) of digital signals (from the ADC 130) converted from cardioid outputs/signals of each output channel of the microphone device 100 is negative (NEG).

To create/produce an omnidirectional ("Omni") polar pattern, digital signals (from the ADC 130) converted from cardioid outputs/signals of Channels 1 and 2 (i.e., the MID-Front and MID-Back mics) are processed via the DSP system 171 as follows: polarity reversal is selected (i.e., phase reversal is set to On) to reverse the polarity of the digital signals from negative to positive (POS), and the digital signals pass through without changing level (i.e., unity gain—no amplifying or attenuating). The capsule mixing system 172 then combines resulting processed digital signals (from the DSP system 171) to create/produce mono sound (i.e., mono sound).

To create/produce a subcardioid/wide cardioid polar pattern, digital signals (from the ADC 130) converted from cardioid outputs/signals of Channels 1 and 2 (i.e., the MID-Front and MID-Back mics) are processed via the DSP system 171 as follows: polarity reversal is selected (i.e., phase reversal is set to On) to reverse the polarity of the digital signals from negative to positive (POS), a −10 dB gain is applied to only digital signals converted from cardioid outputs/signals of Channel 2, and remaining digital signals converted from cardioid outputs/signals of Channel 1 pass through without changing level (i.e., unity gain). The capsule mixing system 172 then combines resulting processed digital signals (from the DSP system 171) to create/produce mono sound.

To create/produce a cardioid polar pattern, digital signals (from the ADC 130) converted from cardioid outputs/signals

TABLE 2

Figure 8:
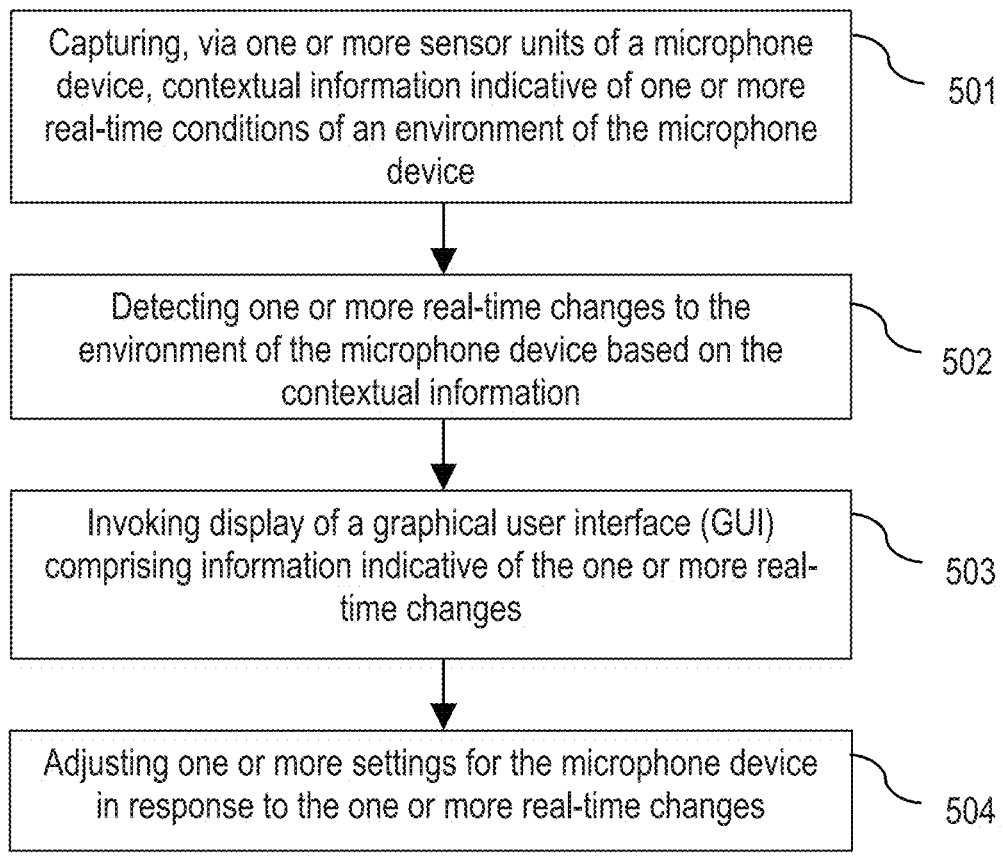
FIG. 8 is a flowchart of an example process for providing a microphone device with advanced functionalities, in one or more embodiments.

1. Polarity Reversal—Select via a toggle GUI button/switch (set to On or Off) to select whether to reverse polarity (between positive (POS) and negative (NEG))
2. Digital/Input Gain—Select amount of gain to apply during DSP via up/down GUI buttons
3. Two State Selectable High Pass Filter—Select via 3 GUI buttons: hard, soft, OFF
4. Two State Selectable Low Pass Filter—Select via 3 GUI buttons: hard, soft, OFF
5. Polar Pattern—Select via graphical interfaces illustrating various polar patterns
   a. Omnidirectional
   b. Wide Cardioid
   c. Cardioid
   d. Super Cardioid
   e. FIG.-8
   f. Wide Stereo (127°)
   g. Narrow Stereo (90°)

Table 3 provides an example of global settings/parameters for the microphone device 100 and corresponding feedback/information included in a GUI.

of Channel 1 are processed via the DSP system 5171 as follows: polarity reversal is selected (i.e., phase reversal is set to On) to reverse the polarity of the digital signals from

TABLE 3

1. GNSS/GPS Readings—latitude and longitude readings/coordinates of the microphone device 100, altitude reading of the microphone device 100
2. Motion Sensor Readings—graphical reference representing a real-time direction of the microphone device 100 relative to a compass, graphical reference representing whether the microphone device 100 is positioned upright or upside down
3. Controlling LEDs of the LED system 181
   a. Identification/wink—select momentary GUI button to make LEDs blink/flash
   b. LEDs ON/OFF—select toggle GUI button/switch to turn LEDs ON/OFF
   c. Color display—select color for LEDs to display from GUI wheel/dropdown/slider (default set to blue)

negative to positive (POS), and the digital signals pass through without changing level (i.e., unity gain). The capsule mixing system 172 then combines resulting processed digital signals (from the DSP system 171) to create/produce mono sound.

To create/produce a supercardioid polar pattern, digital signals (from the ADC 130) converted from cardioid outputs/signals of Channels 1 and 2 (i.e., the MID-Front and MID-Back mics) are processed via the DSP system 171 as follows: polarity reversal is selected (i.e., phase reversal is set to On) only for digital signals converted from cardioid outputs/signals of Channel 1 to reverse the polarity of the digital signals converted from the cardioid outputs/signals of Channel 1 from negative to positive (POS), a −10 dB gain is applied to only digital signals converted from cardioid outputs/signals of Channel 2, and remaining digital signals converted from cardioid outputs/signals of Channel 1 pass through without changing level (i.e., unity gain). The capsule mixing system 172 then combines resulting processed digital signals (from the DSP system 171) to create/produce mono sound.

To create/produce a bidirectional (Figure-8) polar pattern using only digital signals (from the ADC 130) converted from cardioid outputs/signals of Channels 1 and 2 (i.e., the MID-Front and MID-Back mics), the digital signals are processed via the DSP system 171 as follows: polarity reversal is selected (i.e., phase reversal is set to On) only for digital signals converted from cardioid outputs/signals of Channel 1 to reverse the polarity of the digital signals converted from the cardioid outputs/signals of Channel 1 from negative to positive (POS), and the digital signals pass through without changing level (i.e., unity gain). The capsule mixing system 172 then combines resulting processed digital signals (from the DSP system 171) to create/produce mono sound.

To create/produce a bidirectional (Figure-8) polar pattern using only digital signals (from the ADC 130) converted from cardioid outputs/signals of Channels 3 and 4 (i.e., the SIDE-Left and SIDE-Right mics), the digital signals are processed via the DSP system 171 as follows: polarity reversal is selected (i.e., phase reversal is set to On) only for digital signals converted from cardioid outputs/signals of Channel 3 to reverse the polarity of the digital signals converted from the cardioid outputs/signals of Channel 3 from negative to positive (POS), and the digital signals pass through without changing level (i.e., unity gain). The capsule mixing system 172 then combines resulting processed digital signals (from the DSP system 171) to create/produce mono sound.

FIG. 4 illustrates a table 350 describing different pre-defined stereo virtual polar patterns the capsule mixing system 172 is configured to create/produce, in one or more embodiments. As shown in FIG. 4, polarity (i.e., output phase) of digital signals (from the ADC 130) converted from cardioid outputs/signals of each output channel of the microphone device 100 is negative (NEG).

In one embodiment, selecting a stereo virtual polar pattern for Channels 1 or 2 will link Channels 1 and 2 together, and selecting a stereo virtual polar pattern for Channels 3 or 4 will link Channels 3 and 4 together.

To create/produce a wide stereo polar pattern when Channels 1 and 2 are linked together, digital signals (from the ADC 130) converted from cardioid outputs/signals of Channels 1, 3, and 4 (i.e., the MID-Front, SIDE-Left, and SIDE-Right mics) are processed via the DSP system 171 as follows: polarity reversal is selected (i.e., phase reversal is set to On) only for digital signals converted from cardioid outputs/signals of Channels 1 and 3 to reverse the polarity of the digital signals converted from the cardioid outputs/signals of Channels 1 and 3 from negative to positive (POS), and the digital signals pass through without changing level (i.e., unity gain). The capsule mixing system 172 then combines resulting processed digital signals (from the DSP system 171) to create/produce stereo sound (i.e., left (L) channel and right (R) channel).

To create/produce a narrow stereo polar pattern when Channels 1 and 2 are linked together, digital signals (from the ADC 130) converted from cardioid outputs/signals of Channels 1, 3, and 4 (i.e., the MID-Front, SIDE-Left, and SIDE-Right mics) are processed via the DSP system 171 as follows: polarity reversal is selected (i.e., phase reversal is set to On) only for digital signals converted from cardioid outputs/signals of Channels 1 and 3 to reverse the polarity of the digital signals converted from the cardioid outputs/signals of Channels 1 and 3 from negative to positive (POS), a −6 dB gain is applied to only digital signals converted from cardioid outputs/signals of Channels 3 and 4, and remaining digital signals converted from cardioid outputs/signals of Channel 1 pass through without changing level (i.e., unity gain). The capsule mixing system 172 then combines resulting processed digital signals (from the DSP system 171) to create/produce stereo sound.

Figure 5A:
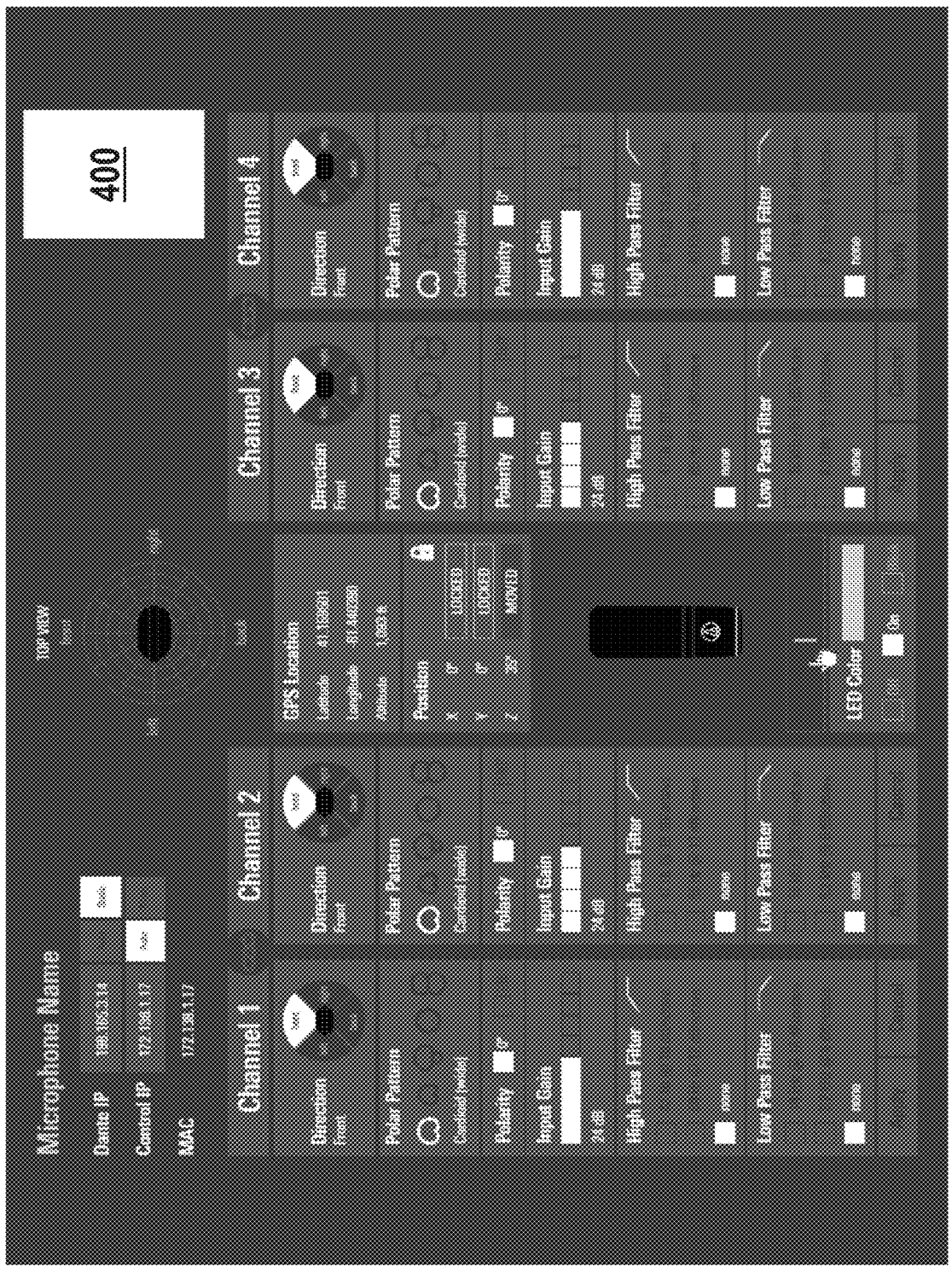
FIG. 5A illustrates an example GUI including settings for the microphone device, in one or more embodiments.

FIG. 5A illustrates an example GUI 400 generated by the GUI system 173, wherein the GUI 400 includes settings for the microphone device 100, in one or more embodiments. As shown in FIG. 5A, the GUI 400 includes global settings/parameters for the microphone device 100. The global settings/parameters include feedback or information indicative of real-time conditions of the environment of the microphone device 100, such as real-time latitude and longitude readings/coordinates (from the motion sensor 193), a real-time altitude reading (from the motion sensor 193), and a real-time position on three coordinate axes X, Y, and Z (from the motion sensor 193).

If the automatic control system 174 detects the microphone device 100 has moved/shifted/tilted from its locked position, the GUI 400 highlights how the microphone device 100 has moved/shifted/tilted. For example, if the real-time position on the X and Y axes are the same as the locked position but the real-time position on the Z axis is different from the locked position, the GUI 400 indicates the microphone device 100 has moved relative to the Z axis.

As shown in FIG. 5A, the GUI 400 further includes output-dependent settings each output channel of the microphone device 100.

Figure 5B:
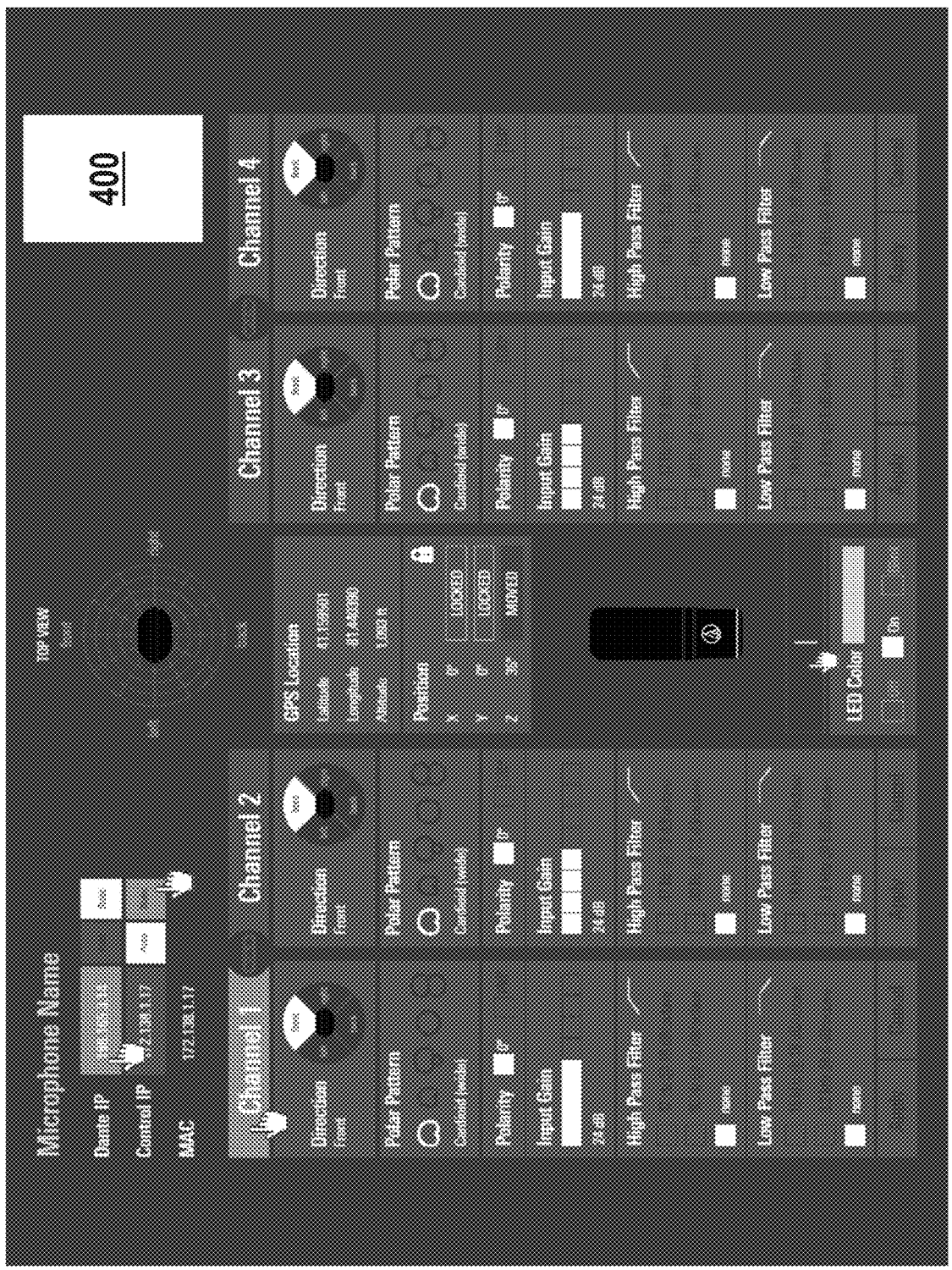
FIG. 5B illustrates an example user interaction with the GUI to select a particular output channel of the microphone device to make changes to, in one or more embodiments.

FIG. 5B illustrates an example user interaction with the GUI 400 to select a particular output channel of the microphone device 100 to make changes to, in one or more embodiments. As shown in FIG. 5B, the user interaction includes selecting Channel 1 to enable a user to make changes to output-dependent settings for Channel 1.

Figure 5C:
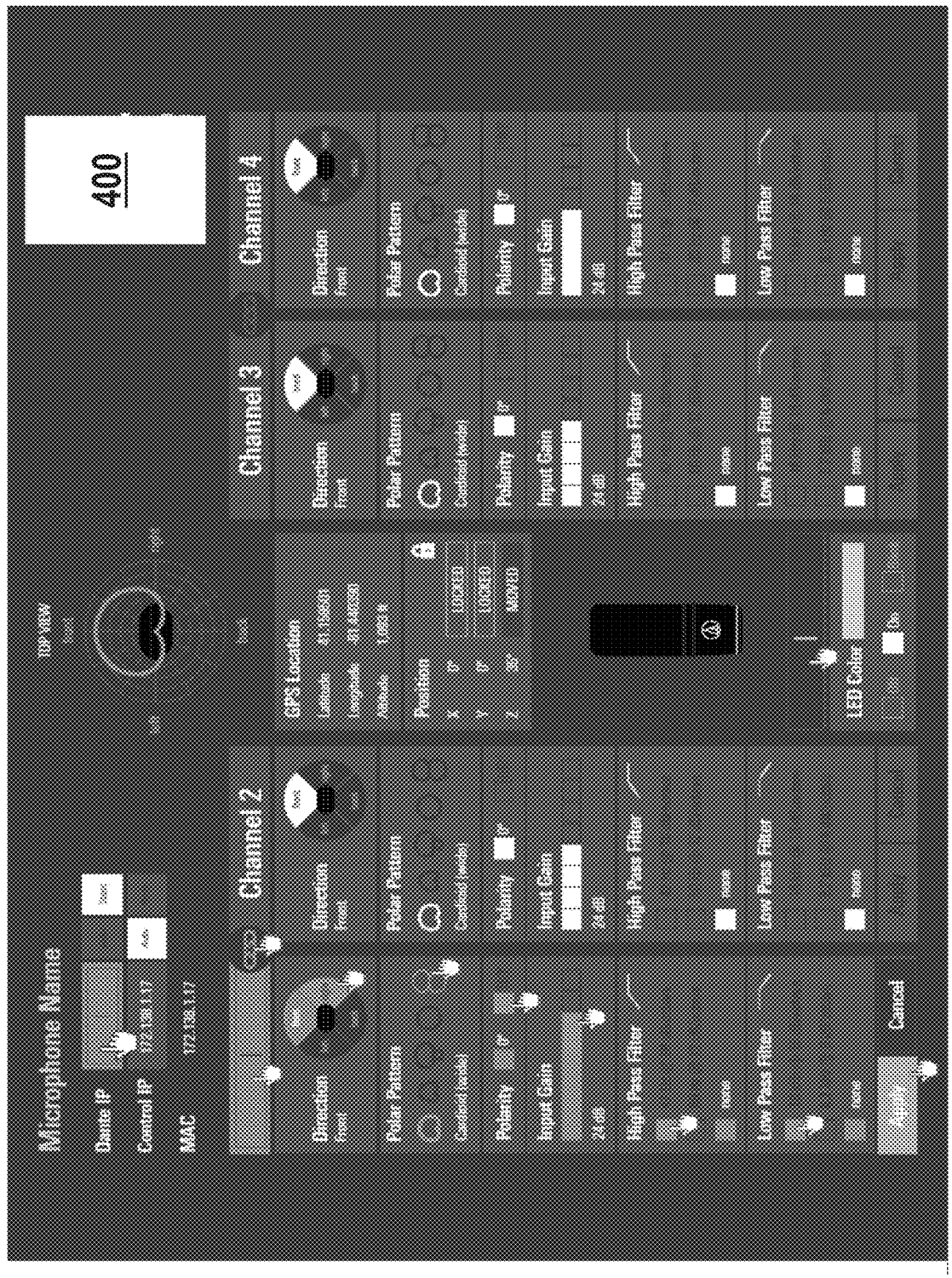
FIG. 5C illustrates additional example user interactions with the GUI to change output-dependent settings for the selected output channel, in one or more embodiments.

FIG. 5C illustrates additional example user interactions with the GUI 400 to change output-dependent settings for the selected output channel, in one or more embodiments. As shown in FIG. 5C, the additional user interactions include selecting different values for the output-dependent settings for Channel 1, such as increasing digital/input gain for Channel 1, selecting polarity reversal to reverse polarity of digital signals converted from cardioid outputs/signals of Channel 1, selecting a HPF of 47 Hz at 18 dB/octave for Channel 1, and selecting a LPF of 18 kHz at 18 dB/octave for Channel 1. The additional user interactions further include changing a polar pattern for Channel 1 from sub-cardioid/wide cardioid to bidirectional (Figure-8).

Figure 6:
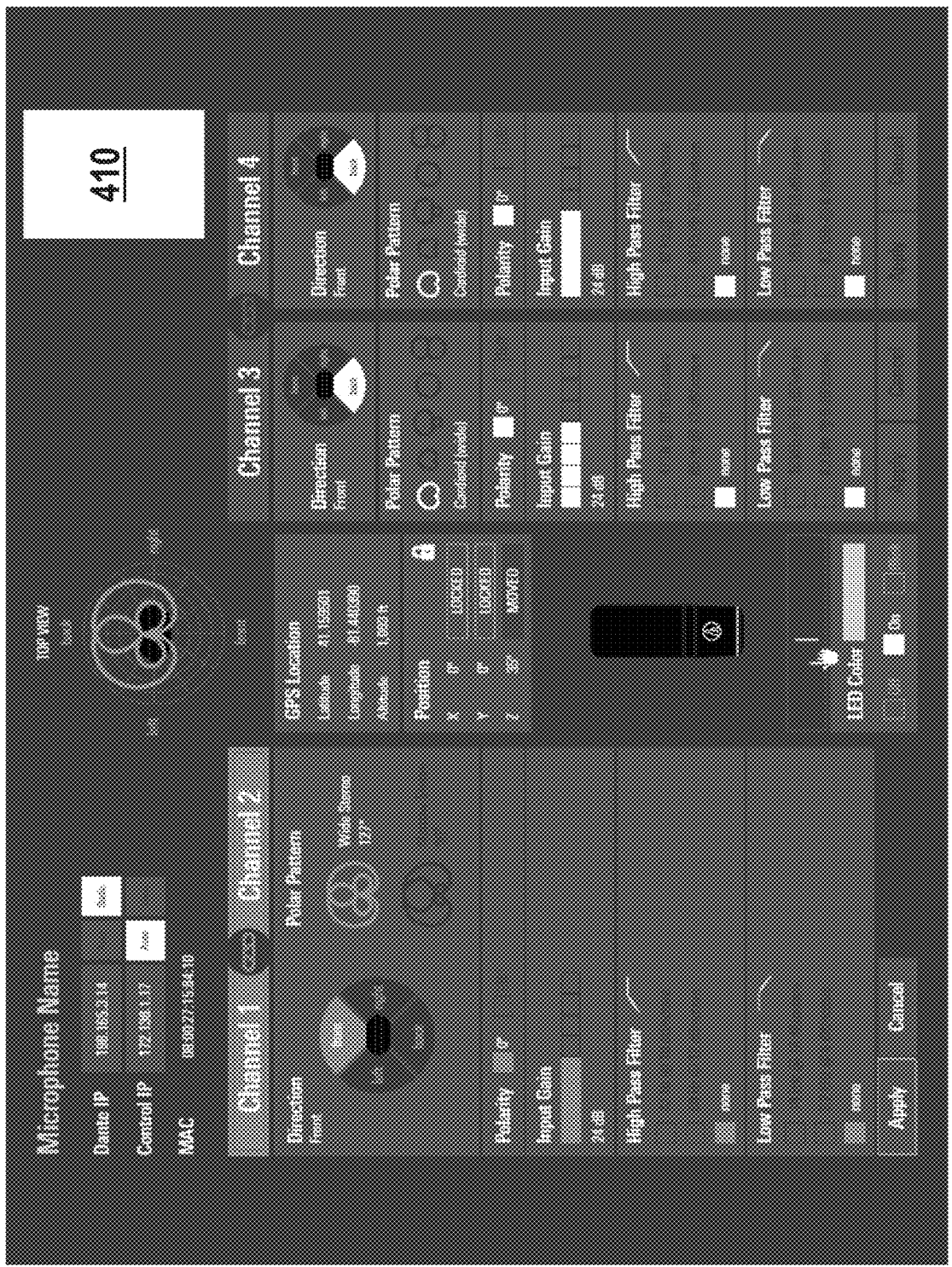
FIG. 6 illustrates another example GUI including settings for the microphone device, in one or more embodiments.

FIG. 6 illustrates another example GUI 410 generated by the GUI system 173, wherein the GUI 410 includes settings for the microphone device 100, in one or more embodiments. As shown in FIG. 6, Output Channel 1 and Output Channel 2 are linked together to create/produce a wide stereo polar pattern.

Figure 7:
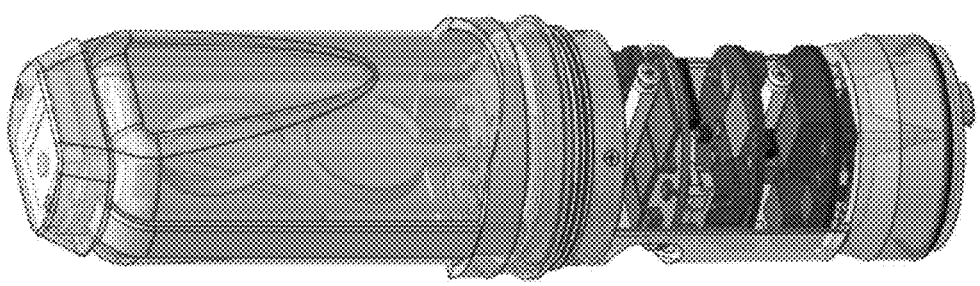
FIG. 7 illustrates an example mechanical design of the microphone device, in one or more embodiments.

FIG. 7 illustrates an example mechanical design of the microphone device 100, in one or more embodiments. In one embodiment, the microphone device 100 is implemented as a multi-output, multi-pattern AoIP condenser microphone for broadcast and live sound applications.

FIG. 8 is a flowchart of an example process 500 for providing a microphone device with advanced functionalities, in one or more embodiments. Process block 501 includes capturing, via one or more sensor units of a microphone device, contextual information indicative of one or more real-time conditions of an environment of the microphone device. Process block 502 includes detecting one or more real-time changes to the environment of the microphone device based on the contextual information. Process block 503 includes invoking display of a graphical user interface (GUI) comprising information indicative of the one or more real-time changes. Process block 504 includes adjusting one or more settings for the microphone device in response to the one or more real-time changes.

In one embodiment, process blocks 501-504 may be performed utilizing one or more components of the microphone device 100, such as the automatic control system 174.

Figure 9:
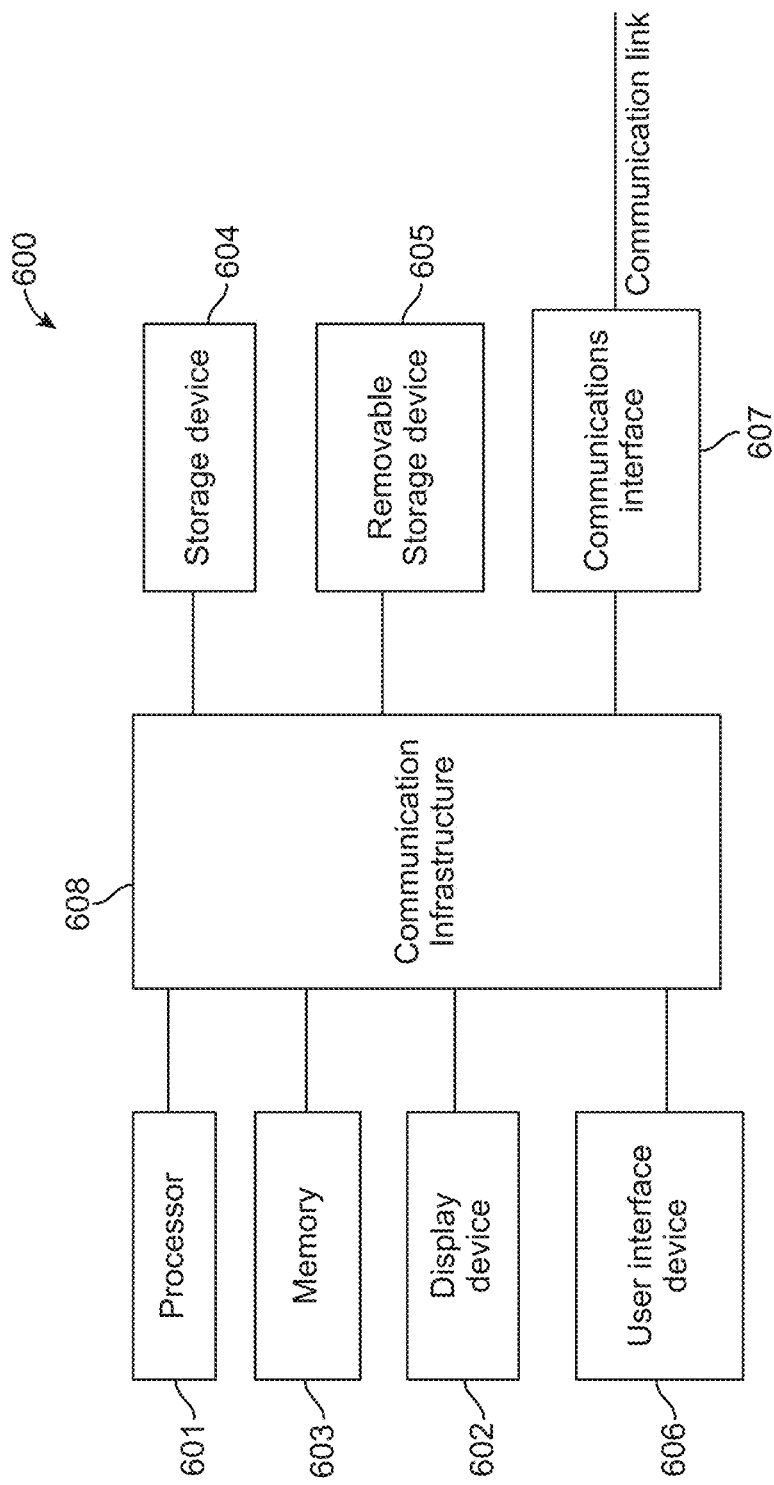
FIG. 9 is a high-level block diagram showing an information processing system comprising a computer system useful for implementing the disclosed embodiments.

FIG. 9 is a high-level block diagram showing an information processing system comprising a computer system 600 useful for implementing the disclosed embodiments. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The main memory 603 may store instructions that when executed by the one or more processors 601 cause the one or more processors 601 to perform one or more process blocks of the process 500.

The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for one or more process blocks of process 500 (FIG. 8) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A device with advanced functionalities, comprising:
one or more sensor units configured for capturing contextual information indicative of one or more real-time conditions of an environment of a microphone coupled to the device; and
one or more software modules configured for:
applying digital signal processing (DSP) to one or more output channels of the microphone;
creating one or more polar patterns for the one or more output channels by combining digital signals resulting from the DSP;
detecting real-time movement of the microphone from a locked position based on the contextual information, wherein the locked position is an initial position of the microphone when initially deployed in the environment; and
dynamically adjusting the one or more polar patterns in response to the real-time movement detected.

2. The device of claim 1, further comprising:
an analog-to-digital converter (ADC) configured for applying analog-to-digital conversion to each analog signal captured by the microphone.

3. The device of claim 1, wherein the one or more software modules include at least one of a DSP module, a capsule mixing module, a GUI module, and an automatic control module.

4. The device of claim 1, wherein the one or more software modules are further configured for:
generating a graphical user interface (GUI) for display, wherein the GUI comprises information indicative of the real-time movement detected, and the GUI is displayed on at least one of a display screen of the microphone, a Near Field Communication (NFC) enabled device, a web browser, or a master processing system connected to the microphone.

5. The device of claim 1, wherein the one or more software modules include an artificial intelligence (AI) engine trained based on training data indicative of different settings for the DSP and different polar patterns suitable for different conditions of the environment.

6. The device of claim 5, wherein the dynamically adjusting comprises:
determining one or more recommendations for one or more settings for the DSP utilizing the AI engine;
generating a graphical user interface (GUI) for display, wherein the GUI comprises the one or more recommendations, and the GUI is displayed on at least one of a display screen of the microphone, a Near Field Communication (NFC) enabled device, a web browser, or a master processing system connected to the microphone;
receiving user input comprising one or more user interactions with the GUI; and
adjusting the one or more settings for the DSP based on the user input.

7. The device of claim 1, wherein the one or more software modules are further configured for sending an alert regarding the one or more real-time conditions of the environment to an operator of the microphone.

8. The device of claim 1, wherein the real-time movement detected indicates at least one of a position, a direction, or an orientation of the microphone has changed.

9. The device of claim 1, wherein the one or more software modules are further configured for:
automatically setting up a DSP configuration corresponding to an identifier in response to the one or more sensor units reading the identifier from a Near Field Communication (NFC) enabled device, wherein the DSP is automatically setup in accordance with the DSP configuration.

10. The device of claim 1, wherein the one or more software modules are further configured for:
automatically setting up the one or more output channels with one or more labels in response to the one or more sensor units reading an identifier from a Near Field Communication (NFC) enabled device, wherein the one or more labels are based on the identifier.

11. A method for providing a device with advanced functionalities, comprising:
capturing, via one or more sensor units of a device, contextual information indicative of one or more real-time conditions of an environment of a microphone coupled to the device;
applying, via one or more software modules of the device, digital signal processing (DSP) of one or more output channels of the microphone;
creating, via the one or more software modules of the device, one or more polar patterns for the one or more output channels by combining digital signals resulting from the DSP;
detecting, via the one or more software modules of the device, real-time movement of the microphone from a locked position based on the contextual information, wherein the locked position is an initial position of the microphone when initially deployed in the environment; and
dynamically adjusting, via the one or more software modules of the device, the one or more polar patterns in response to the real-time movement detected.

12. The method of claim 11, further comprising:
applying, via an analog-to-digital converter (ADC) of the device, analog-to-digital conversion to each analog signal captured by the microphone.

13. The method of claim 11, wherein the one or more software modules include at least one of a DSP module, a capsule mixing module, a GUI module, and an automatic control module.

14. The method of claim 11, further comprising:
generating, via the one or more software modules of the device, a graphical user interface (GUI) for display, wherein the GUI comprises information indicative of the real-time movement detected, and the GUI is displayed on at least one of a display screen of the microphone, a Near Field Communication (NFC) enabled device, a web browser, or a master processing system connected to the microphone.

15. The method of claim 11, wherein the one or more software modules include an artificial intelligence (AI) engine trained based on training data indicative of different settings for the DSP and different polar patterns suitable for different conditions of the environment.

16. The method of claim 15, wherein the dynamically adjusting comprises:
determining one or more recommendations for one or more settings for the DSP utilizing the AI engine;
generating a graphical user interface (GUI) for display, wherein the GUI comprises the one or more recommendations, and the GUI is displayed on at least one of a display screen of the microphone, a Near Field Communication (NFC) enabled device, a web browser, or a master processing system connected to the microphone;
receiving user input comprising one or more user interactions with the GUI; and
adjusting the one or more settings for the DSP based on the user input.

17. The method of claim 11, wherein the one or more software modules are further configured for sending an alert regarding the one or more real-time conditions of the environment to an operator of the microphone.

18. The method of claim 11, wherein the real-time movement detected indicates at least one of a position, a direction, or an orientation of the microphone has changed.

19. The method of claim 11, further comprising:
via the one or more software modules of the device, automatically setting up a DSP configuration corresponding to an identifier in response to the one or more sensor units reading the identifier from a Near Field Communication (NFC) enabled device, wherein the DSP is automatically setup in accordance with the DSP configuration.

20. The method of claim 11, further comprising via the one or more software modules of the device, automatically setting up the one or more output channels with one or more labels in response to the one or more sensor units reading an identifier from a Near Field Communication (NFC) enabled device, wherein the one or more labels are based on the identifier.

\* \* \* \* \*